US012421082B2

(12) United States Patent
Haapaniemi et al.

(10) Patent No.: US 12,421,082 B2
(45) Date of Patent: Sep. 23, 2025

(54) METHOD AND ELEVATOR ARRANGEMENT

(71) Applicant: Kone Corporation, Helsinki (FI)

(72) Inventors: Markku Haapaniemi, Helsinki (FI); Matti Rasanen, Helsinki (FI); Sami Saarela, Helsinki (FI); Anssi Venho, Helsinki (FI); Janne Mikkonen, Helsinki (FI); Otto Lanz, Helsinki (FI); Tarvo Viita-Aho, Helsinki (FI); Petri Kere, Helsinki (FI)

(73) Assignee: Kone Corporation, Helsinki (FI)

( * ) Notice: Subject to any disclaimer, the term of this patent is extended or adjusted under 35 U.S.C. 154(b) by 618 days.

(21) Appl. No.: 17/569,151

(22) Filed: Jan. 5, 2022

(65) Prior Publication Data

US 2022/0127113 A1 Apr. 28, 2022

Related U.S. Application Data

(63) Continuation of application No. PCT/EP2020/069530, filed on Jul. 10, 2020.

(30) Foreign Application Priority Data

Jul. 12, 2019 (EP) .................................... 19186073

(51) Int. Cl.
*B66B 11/00* (2006.01)
*B66B 1/24* (2006.01)
(Continued)

(52) U.S. Cl.
CPC .......... *B66B 11/006* (2013.01); *B66B 1/2416* (2013.01); *B66B 1/3446* (2013.01);
(Continued)

(58) Field of Classification Search
CPC ....... B66B 1/2416; B66B 1/3446; B66B 1/36; B66B 11/006; B66B 11/0226; B66B 2201/103; E04G 21/16
(Continued)

(56) References Cited

U.S. PATENT DOCUMENTS 3,743,116 A * 7/1973 Giessler ................. B65G 37/00 104/165
11,946,274 B2 * 4/2024 Miller ..................... E04H 15/56
(Continued)

FOREIGN PATENT DOCUMENTS

CN 1189445 A 8/1998
CN 204896664 U 12/2015
(Continued)

OTHER PUBLICATIONS

International Search Report and Written Opinion for International Application No. PCT/EP2020/069530 dated Sep. 7, 2020.
(Continued)

*Primary Examiner* — James J Buckle, Jr.
(74) *Attorney, Agent, or Firm* — HARNESS, DICKEY & PIERCE, P.L.C.

(57) ABSTRACT

The invention relates to a method for transporting construction material and/or equipment into and inside a building under construction, wherein the building under construction comprises plurality of vertically displaced floors, the method comprising providing a control system configured to automatically operate one or more transporting devices, including at least an elevator; providing a storage at the construction site of the building; and transporting into the storage at the construction site of the building under construction plurality of transport containers containing construction material and/or equipment; storing said transport containers in the storage; and delivering transport containers belonging to said plurality of transport containers from said storage to different destination floors, the delivering comprising obtaining an order to deliver a transport container, the order identifying the transport container to be delivered; and retrieving the transport container identified in the order from the storage; and moving said transport container at least horizontally to a container loading floor of the building
(Continued)

under construction; and loading said transport container on the load receiving unit for being moved to its destination floor; and obtaining the destination floor information indicating the destination floor of said container; and moving the load receiving unit vertically in the elevator shaft to the destination floor of said transport container; and unloading said transport container from the load receiving unit to the destination floor of said transport container. The invention also relates to a method for constructing a building and an arrangement for transporting construction material, which implement the method for transporting construction material and/or equipment into and inside a building under construction.

20 Claims, 5 Drawing Sheets

(51) Int. Cl.

*B66B 1/34* (2006.01)
*B66B 1/36* (2006.01)
*B66B 11/02* (2006.01)
*E04G 21/16* (2006.01)

(52) U.S. Cl.

CPC ............ *B66B 1/36* (2013.01); *B66B 11/0226* (2013.01); *E04G 21/16* (2013.01); *B66B 2201/103* (2013.01)

(58) Field of Classification Search

USPC ........................................................ 52/741.1
See application file for complete search history.

(56) References Cited

U.S. PATENT DOCUMENTS

| | | | |
|---|---|---|---|
| 11,993,482 | B2 | 5/2024 | Haapaniemi et al. |
| 2006/0283105 | A1 * | 12/2006 | Bertrand .............. B27M 3/0073 52/122.1 |
| 2010/0077678 | A1 * | 4/2010 | Boardman ............ E04B 1/3483 52/311.1 |
| 2010/0119336 | A1 * | 5/2010 | Echauri Senosiain .... E04B 5/48 414/10 |
| 2015/0227122 | A1 | 8/2015 | Harkonen et al. |
| 2017/0183156 | A1 * | 6/2017 | Yoshioka .......... H01L 21/67736 |

FOREIGN PATENT DOCUMENTS

| | | | |
|---|---|---|---|
| CN | 106429750 | A | 2/2017 |
| EP | 3456677 | A1 | 3/2019 |
| EP | 3663251 | A1 | 6/2020 |
| EP | 3763654 | A1 | 1/2021 |
| JP | H0978841 | A | 3/1997 |
| JP | 2001/055833 | A | 2/2001 |
| WO | WO-2017155459 | A1 | 9/2017 |

OTHER PUBLICATIONS

European Search Report For European Patent Application No. 19186073 dated Feb. 4, 2020.
Chinese Office Action dated Jan. 20, 2023 issued in corresponding Chinese Appln. No. 202080050606.X.
Extended European Search Report dated Feb. 2, 2020.
International Search Report PCT/ISA/210 and Written Opinion PCT/ISA/237 for PCT/EP2020/069567 dated Nov. 16, 2020.
Office Action issued Aug. 31, 2023 is U.S. Appl. No. 17/569,086.
Notice of Allowance issued Jan. 22, 2024 in U.S. Appl. No. 17/569,086.

* cited by examiner

METHOD AND ELEVATOR ARRANGEMENT

CROSS-REFERENCE TO RELATED APPLICATION

This application is a continuation of PCT International Application No. PCT/EP2020/069530 which has an International filing date of Jul. 10, 2020, and which claims priority to European patent application number 19186073.3 filed Jul. 12, 2019, the entire contents of both of which are incorporated herein by reference.

FIELD OF THE INVENTION

The invention relates to a method and an elevator arrangement for transporting goods, in particular construction material and/or equipment, into and inside a building under construction.

BACKGROUND OF THE INVENTION

During construction work of a building, people and goods need to move into and around the building under construction for enabling construction work. For example, goods, such as tools, equipment and construction material need to move to the floor where they are to be used. In a building under construction comprising plurality of floors, such as a high-rise tower building, the amount of goods constantly flowing into different parts of the building under construction is considerable.

In common prior art methods used in construction sites of high-rise tower buildings, diversity of different means and methods for transportation has been used in a relatively unsystematic manner. Such means have comprised use of building site cranes, different temporary hoist arrangements, temporary construction time elevators traveling against the outer face of the building under construction, as well as construction time passenger elevators. The goods have been packed in diverse different packages by the suppliers, and transported into their destination floors in diverse different ways.

A drawback has been that goods transportation in buildings under construction, especially in high-rise tower buildings, has not been optimally efficient and well organized. It has been difficult to schedule and ensure timely, safe and reliable flow of goods to the sites where they are needed. Sometimes, traffic has caused delays to deliveries as well as difficulties to scheduling and coordinating different other actions and operations to be carried out at the construction site, such as slip forming or use of construction site cranes, elevators or hoists. Nor have the prior solution ensured smooth transition to serving transportation needs of the final building.

BRIEF DESCRIPTION OF THE INVENTION

The object of the invention is to introduce a new method and a new arrangement for transporting construction material and/or equipment into and inside a building under construction, as well as a new method for constructing a building. An object is to introduce new solutions by which one or more of the above defined problems of prior art and/or problems discussed or implied elsewhere in the description can be solved. An object is particularly to introduce new solutions facilitating efficiency of delivery of goods and ability to manage the process during construction time of a building. An object is moreover to introduce new solutions which provide efficient and timely flow of goods during construction time of a building.

Embodiments are disclosed, inter alia, by which goods can be delivered on time, not too early nor too late, to the floor where they are needed.

Embodiments are disclosed, inter alia, by which at the same time a smooth transition to serving transportation needs of the final building is facilitated, which needs may be different from those of the building during construction time thereof.

It is brought forward a new method for transporting construction material and/or equipment into and inside a building under construction, wherein the building under construction comprises plurality of vertically displaced floors, the method comprising providing one or more transporting devices for transporting transport containers, said one or more transporting devices comprising at least an elevator for transporting goods in the building under construction, the elevator comprising at least a load receiving unit, comprising preferably at least a platform, which load receiving unit is vertically movable, preferably along one or more guide rail lines, in an elevator shaft formed inside the building under construction. The method further comprises providing a control system configured to automatically operate one or more of said one or more transporting devices including at least said elevator; and providing a storage at the construction site of the building; and transporting into the storage at the construction site of the building under construction plurality of transport containers, each transport container containing construction material and/or equipment; and storing said transport containers in the storage; wherein each transport container comprises a container body, in particular delimiting an interior where the construction material and/or equipment stored by the container are positioned, and an identification provided on the container body identifying the container and possibly also its destination floor in the building; and delivering transport containers belonging to said plurality of transport containers from said storage to different destination floors. The delivering comprises obtaining an order to deliver a container, the order identifying the container to be delivered; and retrieving the container identified in the order from the storage; and moving said container identified in the order at least horizontally to a container loading floor of the building under construction; and loading said container on the load receiving unit for being moved to its destination floor; and obtaining a destination floor information, such as a destination floor code for example, indicating the destination floor of said container; and moving the load receiving unit vertically in the elevator shaft to the destination floor of said container; and unloading said container from the load receiving unit to the destination floor of said container. With this solution one or more of the above mentioned objects can be achieved.

The method particularly increases smooth, well organized delivery of goods to its destination. The method utilizes plurality of transport containers, which can be made to be uniform such that they easily can be efficiently transported with the same means. The transportation utilizing containers mentioned can involve starting the trip of the container containing goods from a factory of the goods supplier and travel all the way to the destination floor in the building. The containers can each go through a stage where they are stored at the construction site of the building under construction so that they can be delivered further on time, not too early nor too late, e.g. based on an order. The goods transport is hereby simple to maintain well organized and under supervision.

Traffic jams are simply avoided due to reduced amount of time consuming or too early deliveries. Use of an elevator as mentioned facilitates a smooth transition to serving transportation needs of the final building, whereby the transportation solution can be temporary yet economical. The method moreover is simple to utilize, e.g. using a computer program and/or database, which facilitates that information about each transport container, such as the position, state, contents thereof, are easily accessible. The method is well suitable for being implemented at least partially automatically, but possibly with a high rate of automatization, whereby efficiency of delivery of goods to its destination floor can be facilitated.

Preferable further details are introduced in the following, which further details can be combined with the method individually or in any combination.

In a preferred embodiment, the control system is operatively connected with each of the transporting devices automatically operated by the control system.

In a preferred embodiment, one or more of, possibly all of the aforementioned retrieving the container, moving the container at least horizontally, loading the container on the load receiving unit, moving the load receiving unit vertically, unloading the container from the load receiving unit, is performed by one or more transporting devices automatically operated by the control system, whereby said parts of the delivering of the container identified in the order from the storage to its destination floor is performed automatically.

In a preferred embodiment, said one or more transporting devices comprise one or more of the following, preferably all of the following: a transporting device for retrieving a transport container from the storage; a transporting device for moving a transport container at least horizontally to a container loading floor of the building under construction; a loading device for loading a transport container on the load receiving unit, said loading device being mounted at the loading floor, preferably in front of an opening leading to the shaft in which the load receiving unit is movable; an loading and unloading device for loading a transport container to and unloading it from the load receiving unit, said loading and unloading device being mounted on the load receiving unit, preferably on top of a transport platform of the load receiving unit; unloading devices for unloading a transport container from the load receiving unit, said unloading devices being mounted at destination floors, preferably in front of openings leading to the shaft in which the load receiving unit is movable. Preferably, each or one or more of these transporting devices are automatically operated by the control system.

In a preferred embodiment, the obtaining an order identifying a container to be delivered is performed by the control system. Preferably, said obtaining comprises receiving an order signal from an equipment communicating with the control system. Preferably, said equipment comprises a user interface program running thereon, and operating which user interface a user can make an order. Alternatively, said obtaining can comprise automatically making an order by the control system itself, e.g. based on a schedule.

In a preferred embodiment, said obtaining a destination floor information, (such as a destination floor code, for instance) indicating the destination floor of the container identified in the order is performed by the control system, such as preferably by a sub-control system of the control system, which sub-control system is configured to automatically operate the elevator.

In a preferred embodiment, said obtaining the destination floor information (such as a destination floor code, for instance) indicating the destination floor of the container identified in the order is performed when it is at the loading floor or at least partially on the load receiving unit. Thus, the destination floor information is timely available for use in control of the elevator.

In a preferred embodiment, the method comprises detecting e.g. by the control system, the identification of the container identified in the order when it is at the loading floor or at least partially on the load receiving unit, preferably by aid of a detector mounted at the loading floor or on the load receiving unit. The method preferably further comprises determining the destination floor of the container using the data detected from the identification, e.g. said determining can comprise retrieving from a database the destination floor information (such as a destination floor code) indicating the destination floor associated with the container in question, in particular with an identification code thereof, or detecting a destination floor floor code associated with the container from the identification itself.

In a preferred embodiment, said moving the load receiving unit vertically in the elevator shaft to the destination floor of the container is performed by the elevator automatically operated by the control system.

In a preferred embodiment, said retrieving the container identified in the order from the storage is performed by a transporting device automatically operated by the control system. Preferably, said retrieving the container identified in the order from the storage comprises automatically moving the aforementioned transporting device to the proximity of the storage position determined and thereby to proximity of the container identified in the order, and automatically picking up the container from said storage position with the transporting device, and automatically transporting the container away from its storage position with the transporting device. Thus, automatic retrieving by a transporting device automatically operated by the control system is facilitated. Preferably, said automatically transporting the container away from its storage position with the transporting device comprises automatically placing the container to be carried by another transporting device, such as a transporting device for moving the container at least horizontally to a container loading floor of the building under construction. Thereby automatic passing of the container further in the process is facilitated. The step of automatically transporting the container away from its storage position with the transporting device can also comprise, e.g. prior said placing the container to be carried by another transporting device, automatically carrying the container away from the storage, whereby automatic transport of the container out from storage is achieved.

In a preferred embodiment, the method comprises determining storage position of the container identified in the order, e.g. based on data stored in a database. Such data can associate a storage position for each container stored in the storage. Thus, automatic retrieving by a transporting device automatically operated by the control system is facilitated.

In a preferred embodiment, the identification is in the form of an identification equipment mounted on the container body or markings printed on the container body or on any element mounted thereon. The identification is detectable, e.g. by a detector, such as an electronic detector, or possibly by a person, from the outside of the container, in particular without entering or opening the container. The detector can be for instance a RFID-detector in which case the aforementioned identification equipment preferably comprises an RFID-tag.

In a preferred embodiment, the building under construction is preferably such that it has not reached its final height yet, the upper parts thereof still being missing. Hereby, preferably during the method, the building under construction is constructed to be higher, most preferably during the method new floors are constructed on existing floors of the building under construction.

It is also brought forward a new method for constructing a building, the method comprising transporting construction material and/or construction equipment into and inside a building under construction as described anywhere above, and constructing structures of the building using construction material and/or construction equipment transported in the floors of the building under construction. With this solution one or more of the above mentioned objects can be achieved.

Preferable further details have been introduced already above, and moreover in the following, which further details can be combined with the method individually or in any combination.

In a preferred embodiment, the method for constructing a building comprises constructing a passenger elevator in place of the aforementioned elevator for transporting goods, said constructing comprising constructing a passenger elevator car for transporting people in place of the load receiving unit of the elevator for transporting goods, wherein the car is made to comprise an interior delimited by floor, walls, ceiling and at least one automatic door; and thereafter using the passenger elevator car to transport passengers between floors of the building. Hereby, after efficient construction phase transport of goods, a smooth transition to serving transportation needs of the final building is facilitated, which needs are different from those of the building during construction time thereof. Preferably, said using the passenger elevator car comprises receiving call signals from user interfaces and moving the passenger elevator car in response to said call signals.

In a preferred embodiment, the aforementioned constructing a passenger elevator car comprises installing a new automatic door. The automatic door preferably comprises at least two sliding door leaves.

In a preferred embodiment, the load receiving unit of the elevator for transporting goods does not comprise an automatic door. It may not comprise a door at all. Hereby, it is not intended for passenger transport. Due to lower safety requirements, a door can be even omitted totally, which makes loading and unloading of containers quick and smooth. This also makes it simple to implement the loading and unloading with automatically operated transporting device(s).

In a preferred embodiment, the load receiving unit of the elevator for transporting goods does not comprise an interior delimited by floor, walls, ceiling and an automatic door.

In a preferred embodiment, the load receiving unit of the elevator for transporting goods is vertically movable along one or more vertically oriented guide rail lines in an elevator shaft. Thus, heavy and large transport containers can be transported in the shaft with relatively high speed and safety. The guide rail lines can optionally be utilized in the final elevator, whereby a later transformation of the goods elevator to form a passenger elevator in its place is facilitated.

In a preferred embodiment, in said constructing the passenger elevator car is arranged to be vertically movable along one or more of the vertically oriented guide rail lines of the load receiving unit of the elevator for transporting goods.

It is also brought forward a new arrangement for transporting construction material and/or equipment into and inside a building under construction, which building under construction comprises plurality of vertically displaced floors, the arrangement comprising one or more transporting devices comprising at least an elevator for transporting goods in the building under construction, the elevator comprising at least a load receiving unit, comprising preferably at least a platform, which load receiving unit is vertically movable, preferably along one or more guide rail lines, in an elevator shaft formed inside the building under construction. The arrangement further comprises a storage at the construction site of the building under construction storing plurality of transport containers, each transport container containing construction material and/or equipment; wherein each said transport container comprises a container body, in particular delimiting an interior where the construction material and/or construction equipment stored by the container are positioned, and an identification provided on the container body for identifying the container and possibly also its destination floor code; and a control system configured to obtain an order identifying a container to be delivered, and to obtain a destination floor information (such as a destination floor code) indicating the destination floor of the container identified in the order; the control system being configured to automatically operate one or more of said transporting devices, including at least said elevator, for automatically performing one or more parts of the delivering of the container identified in the order from the storage to its destination floor. With this solution one or more of the above mentioned objects can be achieved.

Preferable further details have been introduced already above, and moreover in the following, which further details can be combined with the arrangement individually or in any combination.

In a preferred embodiment, said one or more transporting devices comprise one or more of the following, preferably all of the following: a transporting device for retrieving a transport container from the storage; a transporting device for moving a transport container at least horizontally to a container loading floor of the building under construction; a loading device for loading a transport container on the load receiving unit, said loading device being mounted at the loading floor, preferably in front of an opening leading to the shaft in which the load receiving unit is movable; an loading and unloading device for loading a transport container to and unloading it from the load receiving unit, said loading and unloading device being mounted on the load receiving unit, preferably on top of a transport platform of the load receiving unit; unloading devices for unloading a transport container from the load receiving unit, said unloading devices being mounted at destination floors, preferably in front of openings leading to the shaft in which the load receiving unit is movable. Preferably, each or one or more of these transporting devices are automatically operated by the control system.

In a preferred embodiment, the control system comprises one or more detectors for detecting the identifications of the containers. The one or more detectors are preferably electronic detectors. They can be for instance RFID-detectors in which case the identification equipment comprises preferably an RFID-tag. The one or more detectors are preferably automatically operated by the control system.

In a preferred embodiment, the control system is configured to obtain the destination floor information (such as a destination floor code) indicating the destination floor of the container identified in the order, e.g. by a sub-control system of the control system, which sub-control system is configured to automatically operate the elevator, when the container is at the loading floor or at least partially on the load receiving unit.

In a preferred embodiment, the control system is configured to detect the identification of the container identified in the order when it is at the loading floor or at least partially on the load receiving unit, preferably by aid of a detector mounted at the loading floor or on the load receiving unit. The control system is preferably further configured to determine the destination floor of the container using the data detected from the identification, e.g. said determining can comprise retrieving from a database a destination floor code associated with the container or detecting a destination floor code associated with the container from the identification itself.

In a preferred embodiment, said loading device is a conveyor. Preferably, it comprises a motor driven conveying track on top of which the container can be moved supported by the conveying track. The conveyor is preferably automatically operated by the control system.

In a preferred embodiment, said loading and unloading device is a conveyor. Preferably, it comprises a motor driven conveying track on top of which the container can be moved supported by the conveying track. The conveyor is preferably automatically operated by the control system.

In a preferred embodiment, said unloading device is a conveyor. Preferably, it comprises a motor driven conveying track on top of which the container can be moved supported by the conveying track. The conveyor is preferably automatically operated by the control system.

In a preferred embodiment, said transporting device for moving the container at least horizontally to a container loading floor of the building under construction is a conveyor. Hereby, the aforementioned moving the container at least horizontally to a container loading floor of the building under construction comprises moving the container at least horizontally with a conveyor. Preferably, the conveyor comprises a motor driven conveying track on top of which the container can be moved supported by the conveying track. The conveyor is preferably automatically operated by the control system. The conveyor can comprise one or more motor driven conveyor sections on top of which the container is moved horizontally. As an alternative, the transporting device for moving the container at least horizontally to a container loading floor of the building under construction can comprise one or more automated guided vehicles configured to travel automatically a route between the storage and the loading floor.

In a preferred embodiment, said different destination floors include at least 5 different destination floors preferably more, such as more than 10 different destination floors, possibly more than 20 different destination floors, possibly even more than 50 different destination floors. The above defined method and arrangement are advantageous in this kind of a context where the construction site is large and potentially high in traffic, such as when the building under construction is tall.

In a preferred embodiment, said identification of a container stores or presents in a detectable manner an identification code of the container and/or its destination floor code.

In a preferred embodiment, the storage is located outside the building under construction, preferably less than 1 kilometer therefrom.

In a preferred embodiment, said storage stores more than 20, preferably more than 50, more preferably more than 100, of said containers. The above defined method and arrangement are advantageous in this kind of a context where the construction site is large and potentially high in traffic, such as when a large amount of goods is to be transported into the building under construction.

In a preferred embodiment, said storage comprises a shelf arrangement comprising one or more shelfs. Preferably, the shelf arrangement comprises plurality of storage positions each suitable for receiving one or said containers. Preferably, each shelf comprises at least 2, preferably more, such as 3-10 storeys for storing containers. Preferably, each storey comprises plurality of adjacent storage positions each suitable for receiving one or said containers. The storage preferably comprises an identification per each storage position identifying the storage position in question.

In a preferred embodiment, the transport containers are of same or at least substantially same size and shape.

In a preferred embodiment, the transport containers are each rectangular cuboids.

In a preferred embodiment, the transport containers have each four walls, a ceiling and a floor. Preferably, one or more of the walls is openable or comprises a door.

In a preferred embodiment, the interior of each containers is at least 4 m3 in volume. Thus, the transport containers are large scale transport containers.

In a preferred embodiment, the width height and length of each container are each at least 1 m. Thus, the transport containers are large scale transport containers.

In a preferred embodiment, the body of the container comprises metal, preferably majority (i.e. more than half) of its weight is produced by metal material. This means that the containers are metal containers and they are durable for use in many construction sites.

In a preferred embodiment, the bodies of the containers delimit each an interior where the construction material and/or construction equipment stored by the container are positioned. The interiors of the containers are preferably of same or at least substantially same size and shape.

In a preferred embodiment, the aforementioned elevator shaft is a space inside the building under construction. This is advantageous since in this way, the construction time vertical transport can simply be performed using a space which can safely and efficiently used also for passenger transport of the elevator of the final building. This kind of space provides a safe and efficient route for the transport containers to their destination floors without great amount of temporary construction time equipment. The elevator shaft is preferably a space surrounded by walls of the building, said walls preferably being concrete walls.

In a preferred embodiment, the control system comprises a sub-control system configured to automatically operate the transporting device to retrieve the container identified in the order from the storage.

In a preferred embodiment, the control system comprises a sub-control system configured to automatically operate the goods elevator to move the load receiving unit vertically in the elevator shaft to the destination floor of the container identified in the order.

In a preferred embodiment, the control system comprises a sub-control system configured to automatically operate the transporting device to move the container identified in the order at least horizontally to a container loading floor of the building under construction.

In a preferred embodiment, the control system comprises a sub-control system configured to automatically operate the loading device to load the container identified in the order on the load receiving unit.

In a preferred embodiment, the control system comprises a sub-control system configured to automatically operate the loading and unloading device.

In a preferred embodiment, the control system comprises a sub-control system configured to automatically operate the unloading device.

In a preferred embodiment, the control system comprises a main control system to which one or more sub-control systems are connected. The main control system can be configured to send signals to one or more sub-control systems for controlling their operation and it can be configured to receive signals from the sub-control systems, whereby monitoring of their operation is facilitated.

In a preferred embodiment, said construction material comprises elements to be installed to form part of the building under construction, such as one or more of panels, doors, windows, wall elements, ceiling elements, electric wires, floor elements, appliances, such as kitchen appliances, or any other construction material such as sand or concrete, for example.

In a preferred embodiment, said equipment to be transported into and inside a building under construction is construction equipment. Said equipment preferably comprises tools and/or machines. Said equipment to be transported into and inside a building under construction can alternatively comprise a construction site toilet or a construction site kitchen. With a container as mentioned and described anywhere in the application, said equipment will be delivered safely and unharmed. Also, said equipment or parts thereof can be kept inside the container in which they were delivered during their use, and afterwards removed from the site and from the building inside the same container in which they were delivered, which is efficient and simple.

In a preferred embodiment, said one or more detectors comprise plurality of detectors at spaced apart locations, preferably including one or more of: a detector in the storage, a detector at the container loading floor, a detector on the load receiving unit, a detector at one or more destination floors.

In a preferred embodiment, the control system comprises a database. The database is preferably stored in a cloud such as a cloud comprised in the control system.

In a preferred embodiment, the detectors are such that each said detector has a detection range, whereby detection of an identification of a container within the detection range indicates that the container is within the detection range, and thereby the location of the container. The detector can be an RFID-detector, for example in which case the identification equipment preferably comprises an RFID-tag. The detector can alternatively be for instance a so called Bluetooth device.

In a preferred embodiment, the aforementioned database stores location codes associated with identification codes of transport containers. Particularly, preferably the database stores a location code associated with the identification code of each transport container, the location code preferably indicating location of the transport container in question. Progress of the transportation is thus simple to monitor when desired, e.g. by reading the database.

In a preferred embodiment, the database is readable by a user interface program installed on a mobile communication device, such as a phone or a tablet. Hereby, a person using the mobile communication device can receive information about a transport container, such as the location, state or contents thereof, which facilitates monitoring of the progress of the transportation.

In a preferred embodiment, the database is modifiable by a user interface program installed on a mobile communication device, such as a phone or a tablet.

In a preferred embodiment, The control system is configured to automatically update in the database the location code of a container in response to detection of the identification of the container by a detector and/or the control system is configured to automatically send a signal to a program installed on a mobile communication device, such as a phone or a tablet in response to detection of the identification of the container by a detector.

BRIEF DESCRIPTION OF THE DRAWINGS

In the following, the present invention will be described in more detail by way of example and with reference to the attached drawings, in which.

DETAILED DESCRIPTION

Figure 1:
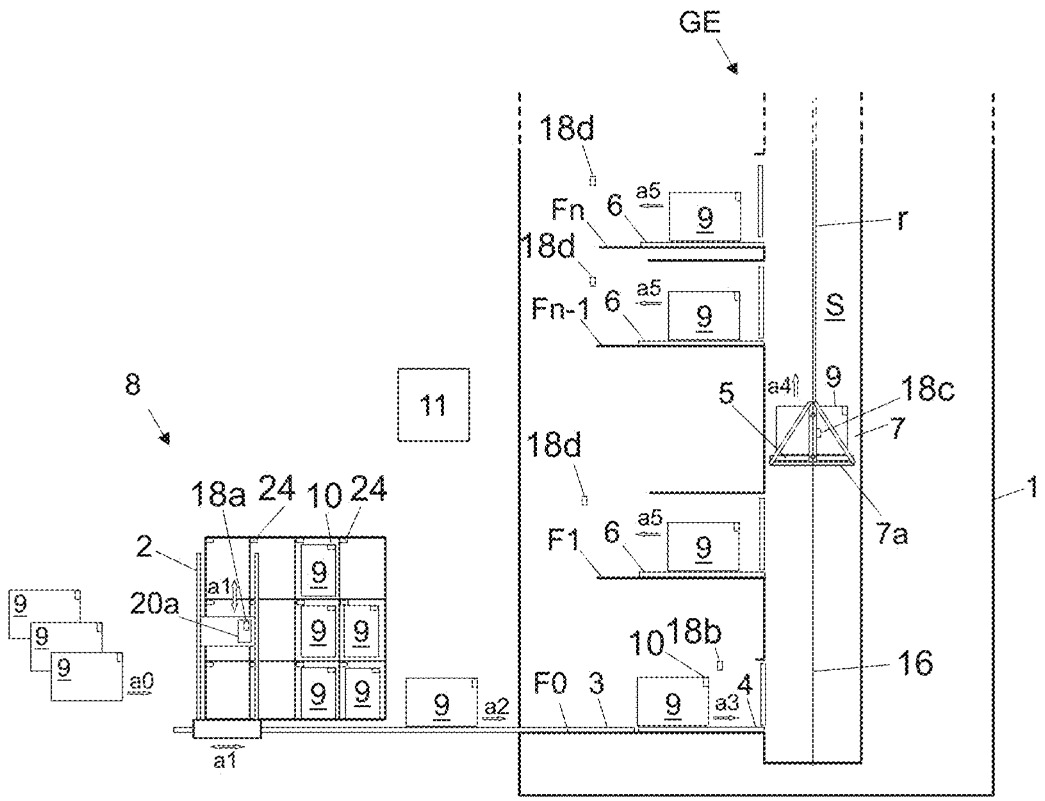
FIG. 1 illustrates an arrangement for transporting construction material and/or equipment into and inside a building according to the invention implementing a method according to the invention.

FIG. 1 illustrates an arrangement as well as progress of a method for transporting construction material and/or equipment into and inside a building 1 under construction. The building 1 under construction comprises plurality of vertically displaced floors F0-Fn.

The method comprises providing plurality of transporting devices 2, 3, 4, 5, 6, GE for transporting transport containers 9 (also referred to as containers). Said transporting devices comprise an elevator GE for transporting goods in the building 1 under construction, later also referred to as a goods elevator.

The elevator GE comprises a load receiving unit 7 vertically movable in an elevator shaft S formed inside the building 1 under construction. The load receiving unit 7 is preferably vertically movable along one or more guide rail lines mounted in the elevator shaft S. The load receiving unit 7 is preferably comprises at least a platform 7*a* for supporting a container 9.

For enabling automatic operation, the method comprises providing a control system 11 configured to automatically operate one or more of said transporting devices 2-6, GE, including said elevator GE. In the preferred embodiments, the control system 11 is configured to automatically operate plurality of said transporting devices 2-6, GE, most preferably all of said transporting devices 2-6, GE, which is advantageous as it facilitates fluency, accuracy and efficiency of the flow of the transport containers 9 towards their destination floors.

Figure 2:
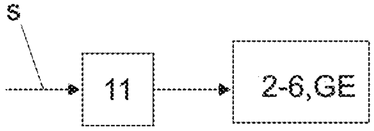
FIG. 2 illustrates a preferred connection between the control system and the transporting devices.

In FIGS. 1 and 2, the control system 11 is illustrated schematically and in a simplified manner. It is preferable that the control system 11 however is a control complex comprising plurality of sub control systems which are configured to automatically control operation of different devices of said one or more transporting devices 2-6, GE. The sub control systems are described further later referring to FIG. 7.

The method moreover comprises providing a storage 8 at the construction site of the building 1 under construction, and transporting into the storage 8, as illustrated with arrows a0, plurality of transport containers 9, each transport container 9 containing construction material 9*d* and/or equipment 9*d*', and storing each of said transport containers 9 in the storage 8.

Each said transport container 9 comprises a container body 9*a* delimiting an interior 9*b* where the construction material 9*d* and/or construction equipment 9*d*' stored by the container 9 are positioned, and an identification 10 provided on the container body 9*a* for identifying the container 9 and possibly also its destination floor in the building 1. The identification 10 preferably is in the form of an identification equipment mounted on the container body 9*a* or markings printed on the container body 9*a* or any element mounted thereon. The identification 10 is detectable, e.g. by a detector, such as an electronic detector, or possibly by a person, from the outside of the container 9, in particular without entering or opening the container 9. Each said transport container 9, in particular the body 9*a* thereof, preferably moreover comprises an openable wall or door 9*c*, which may or may not be similar in shape and position in different containers 9. The aforementioned detector, is preferably an electronic detector, in which case it can be for instance an RFID-detector in which case the identification equipment comprises preferably an RFID-tag. The detector can alternatively be for instance a so called Bluetooth device.

The method moreover comprises delivering transport containers 9 belonging to said plurality of transport containers 9 from said storage 8 to different destination floors F1-Fn i.e. different vertically displaced floors of the building under construction.

The delivering of each transport container 9 comprises obtaining an order, e.g. in the form of an order signal s, to deliver a container 9, the order identifying the container 9 to be delivered, and thereafter retrieving the container 9 identified in the order from the storage 8, as illustrated with arrows a1, and thereafter moving, as illustrated with arrow a2, the container 9 identified in the order at least horizontally (i.e. movement occurs at least in horizontal direction) to a container loading floor F0 of the building 1 under construction, and thereafter loading, as illustrated with arrow a3, the container 9 on the load receiving unit 7 for being moved to its destination floor carried by the load receiving unit. The method moreover comprises, in particular at a suitable moment, obtaining the destination floor information (such as a floor code) indicating the destination floor (F1-Fn) of the container 9 identified in the order. After said loading the container 9 on the load receiving unit 7, the method comprises automatically moving, as illustrated with arrow a4, the load receiving unit 7 vertically in the elevator shaft 6 to the destination floor of the container 9. After said moving the load receiving unit 7 vertically, the method comprises unloading the container 9 from the load receiving unit 7 to the destination floor of the container 9, as illustrated with arrows a5.

In the preferred embodiment, said transporting devices 2-6, GE comprise a transporting device 2 for retrieving the container 9 identified in the order from the storage 8 and a transporting device 3 for moving the container identified in the order at least horizontally to a container loading floor F0 of the building 1 under construction and a loading device 4 for loading the container 9 identified in the order on the load receiving unit 7, said loading device 4 being mounted at the loading floor F0, preferably in front of an opening 21 leading to the shaft 6 in which the load receiving unit 7 is movable, and a loading and unloading device 5 for loading the container 9 identified in the order to and unloading it from the load receiving unit 7, said loading and unloading device 5 being mounted on the load receiving unit 7, preferably on a transport platform 7*a* of the load receiving unit 7 and an unloading device 6 for unloading the container 9 identified in the order from the load receiving unit 7, said unloading device 6 being mounted at the destination floor F1-Fn, preferably in front of an opening 21 leading to the shaft 6 in which the load receiving unit 7 is movable, and the aforementioned elevator GE for moving the container 9 identified in the order from the storage 8 on the load receiving unit 7 vertically in the elevator shaft S to the destination floor of the container 9.

In the preferred embodiment, as FIG. 2 illustrates, the control system 11 is operatively connected with each of the aforementioned transporting devices 2-6, GE. In the preferred embodiment, each of the aforementioned retrieving the container 9, moving the container 9 at least horizontally, loading the container 9 on the load receiving unit 7, moving the load receiving unit 7 vertically, unloading the container 9 from the load receiving unit 7, is performed by one or more transporting devices 2-6, GE automatically operated by the control system 11, whereby said parts of the delivering of the container 9 identified in the order from the storage 8 to its destination floor is performed automatically. When plurality of transporting devices 2-6, GE is in this way automatically operated an automatic flow of containers 9 can be facilitated. It is not necessary, even though preferable, that each of the aforementioned transporting devices 2-6, GE is in this way automatically operated, since the advantages can be partially achieved if only a group of transporting devices 2-6, GE is in this way automatically operated.

Figure 3:
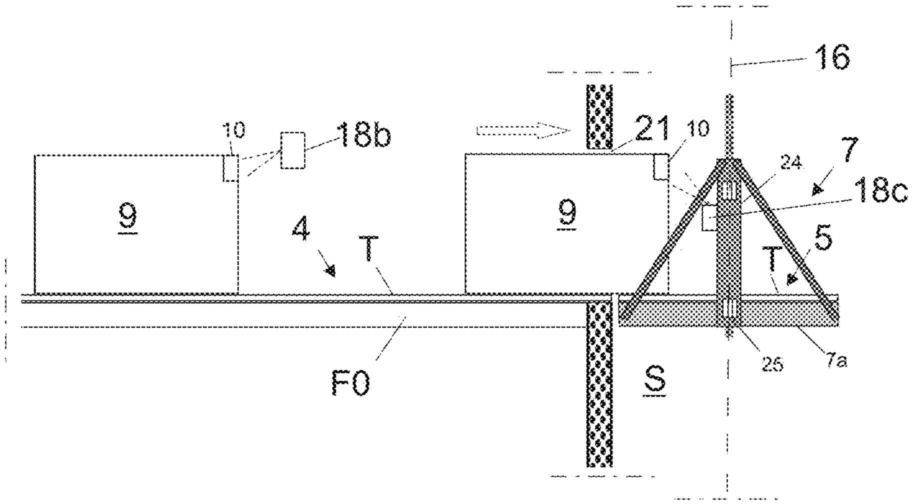
FIG. 3 illustrates preferred details of the arrangement and the method wherein a container is being loaded on a load receiving unit.

FIG. 3 illustrates preferred details of the loading the container 9 on the load receiving unit 7 for being moved to its destination floor. The loading the container 9 on the load receiving unit 7 is performed by loading device 4 mounted at the loading floor F0, in particular in front of an opening 21 leading to the shaft 6 in which the load receiving unit 7 is movable and a loading and unloading device 5, said loading and unloading device 5 is mounted on the load receiving unit 7, in particular on top of a transport platform 7*a* of the load receiving unit 7. Said loading device 4 and said loading and unloading device 5 are transporting devices automatically operated by the control system 11.

Figure 9:
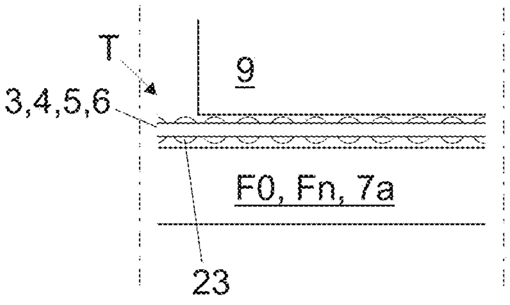
FIG. 9 illustrates preferred details of the arrangement of FIGS. 1 and 3-5.

Each said loading device 4 and said loading and unloading device 5 is a motor driven conveyor comprising a conveying track T on top of which the container can be moved supported by the conveying track T. The conveying track T comprises one or more rotatable elements 23 as more specifically illustrated in FIG. 9 presenting preferred details of the conveying track T. Said rotatable elements 23 can be rotatable rollers, but alternatively they could be rotatable belts or chains on top of which the container can be moved supported by the one or more rotatable elements. The conveying track is preferably motor driven, in which case the motor is controllable by the control system 11. This can be implemented such that the control system 11 comprises a sub-control system 50 for controlling operation of the loading device 4, in particular said motor thereof, and a sub-control system 60 for controlling operation of the loading and unloading device 5, in particular said motor thereof.

FIG. 3 also illustrates preferred details facilitating obtaining the destination floor information (such as a floor code) indicating the destination floor (F1-Fn) of the container 9. In the preferred embodiment illustrated, the method comprises detecting by the control system 11 the identification 10 of the container 9 when it is at the loading floor F0 or alternatively when it is at least partially on the load receiving unit 7. FIG. 3 illustrates both of these alternatives, one of which may or may not be omitted. The detecting is performed by aid of a detector 18*b*, which is mounted, in the first of said alternatives, at the loading floor F0, and in the second of said alternatives by aid of a detector 18*c* mounted on the load receiving unit 7. The method moreover comprises determining the destination floor of the container 9 using the data detected from the identification 10. This can be implemented for example such that said determining comprises retrieving from a database D of the control system 11 a destination floor code associated with the container 9 in question, in particular with an identification code thereof, or detecting a destination floor code associated with the container 9 from the identification itself in case the identification 10 itself identifies the destination floor of the container 9 in question.

Obtaining the destination floor information (such as a floor code) indicating the destination floor of the container 9 facilitates that the control system 11, preferable more specifically the sub-control system 30 for controlling operation of the goods elevator GE, can automatically move the load receiving unit 7 vertically in the elevator shaft 6 to the destination floor of the container 9 loaded thereon.

Generally, it is preferable that the obtaining the destination floor information (such as a floor code) indicating the destination floor (F1-Fn) of the container 9 is performed by a sub-control system 30 of the control system 11, which sub-control system 30 is configured to automatically operate the elevator goods elevator GE. It is possible that a different part of the control system 11 already possesses the destination floor information of the container 9, but for facilitating automatic moving the load receiving unit 7 vertically in the elevator shaft S to the destination floor of the container 9 loaded thereon, it is preferred that the sub-control system 30 configured to control operation of the goods elevator GE obtains the destination floor information indicating the destination floor.

Preferably, the obtaining the destination floor information indicating the destination floor of the container 9 identified in the order is performed when it is at the loading floor F0 or at least partially on the load receiving unit 7. Thus, the sub-control system 30 responsible for elevator operations obtains this information in time so that it can carry out transporting the container 9 to a correct floor. The destination floor obtained can be provided by the aforementioned determining the destination floor of the container 9 using the data detected from the identification 10.

Figure 4:
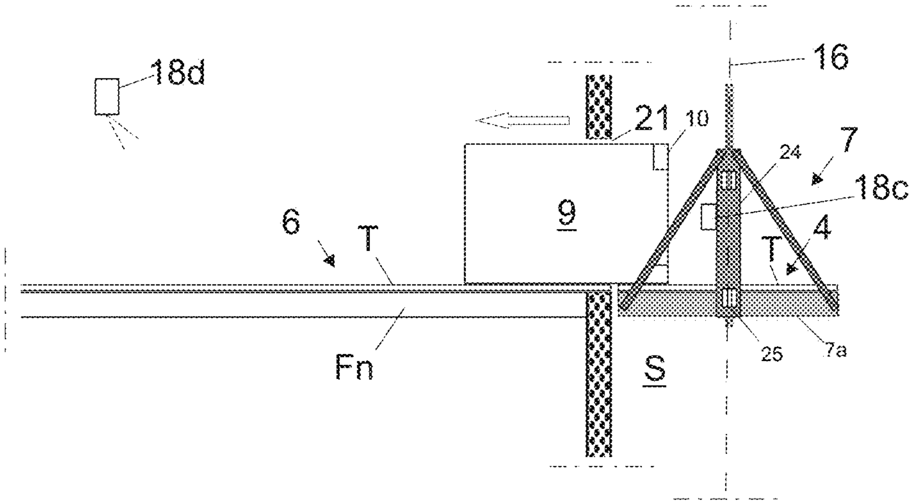
FIG. 4 illustrates preferred details of the arrangement and the method wherein a container is being unloaded from a load receiving unit.

FIG. 4 illustrates preferred details of the unloading the container 9 from the load receiving unit to the destination floor of the container 9. The unloading is performed by a loading and unloading device 5 mounted on the load receiving unit 7, in particular on top of a transport platform 7*a* of the load receiving unit 7 and an unloading device 6 mounted at the destination floor (in this case floor Fn) in front of an opening 21 leading to the shaft S in which the load receiving unit 7 is movable. Said unloading device 6 and said loading and unloading device 5 are transporting devices automatically operated by the control system 11.

Each said unloading device 6 and said loading and unloading device 5 is a conveyor comprising a conveying track T on top of which the container 9 can be moved supported by the conveying track T. The conveying track T preferably comprises one or more rotatable elements 23 as more specifically illustrated in FIG. 9 presenting preferred details of the conveying track T. Said rotatable elements 23 can be rotatable rollers, but alternatively they could be rotatable belts or chains on top of which the container 9 can be moved supported by the one or more rotatable elements. The conveying track is preferably motor driven, in which case the motor is controllable by the control system 11. This can be implemented such that the control system 11 comprises a sub-control system 70 for controlling operation of the unloading device 6, in particular said motor thereof, and a sub-control system 60 for controlling operation of the loading and unloading device 5, in particular said motor thereof.

Generally, it is preferable that the transporting device 3 for moving the container 9 at least horizontally to a container loading floor F0 of the building 1 under construction is a motor driven conveyor comprising a conveying track T on top of which the container 9 can be moved supported by the conveying track T. The conveying track T preferably comprises one or more rotatable elements 23 as more specifically illustrated in FIG. 9 presenting preferred details of the conveying track T. Said rotatable elements 23 can be rotatable rollers, but alternatively they could be rotatable belts or chains on top of which the container 9 can be moved supported by the one or more rotatable elements. The conveyor 3 is preferably automatically operable by the control system 11, such as by a sub-control system 40 thereof. The conveying track is preferably motor driven, in which case the motor is controllable by the control system 11, such as by a sub-control system 70 thereof.

Figure 5:
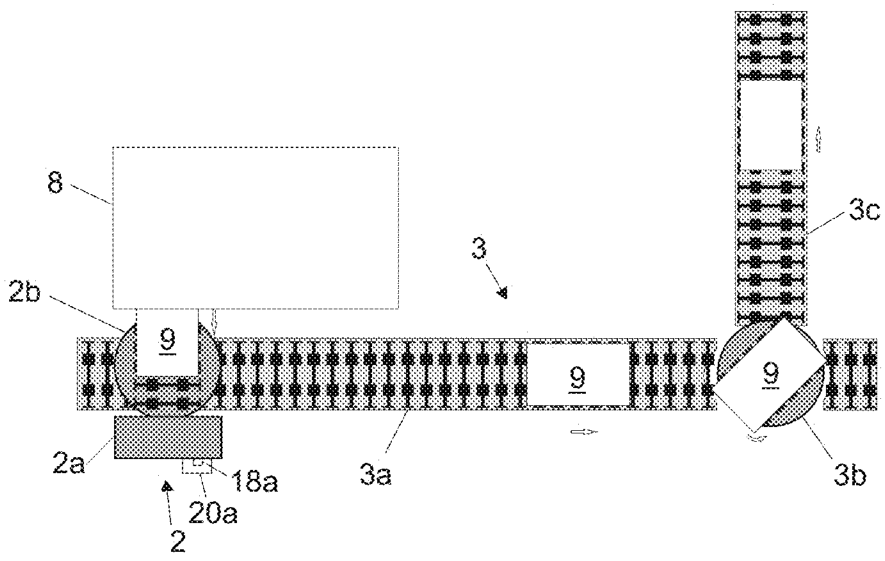
FIG. 5 illustrates preferred details of the storage and the transportation devices.

FIG. 5 illustrates preferred details of the conveyor 3. The conveyor 3 presented comprises plurality of motor driven conveyor sections 3*a*,3*c* on top of which the container is moved horizontally in the method. The conveyor 3 comprises a first section 3*a* and a second section 3*c* and a turning table 3*b* between them for turning the conveyor around a vertical axis. Thus, the path of the container 9 can be fitted well suited for the passages of the construction site as well as the building. Each said conveyor section can be a belt conveyor unit or a roller conveyor unit, for example.

The solution can be implemented also with different means for transportation. The transporting device 3 for moving the container identified in the order at least horizontally to a container loading floor F0 of the building 1 under construction can for instance comprise an automated guided vehicle configured to travel automatically a route between the storage 8 and the loading floor F0.

In the method for constructing a building according to the invention, the method comprises transporting construction material and/or construction equipment into and inside a building 1 under construction according to the method described above referring to FIG. 1, and constructing structures of the building 1 under construction using construction material 9*d* and/or construction equipment 9*d'* transported in the floors of the building 1 under construction. Said construction material 9*d* can comprise elements to be installed to form part of the building 1 under construction, such as one or more of panels, doors, windows, wall elements, ceiling elements, electric wires, floor elements, for instance, and the construction equipment 9*d'* can comprise tools or machines, for instance.

Figure 10:
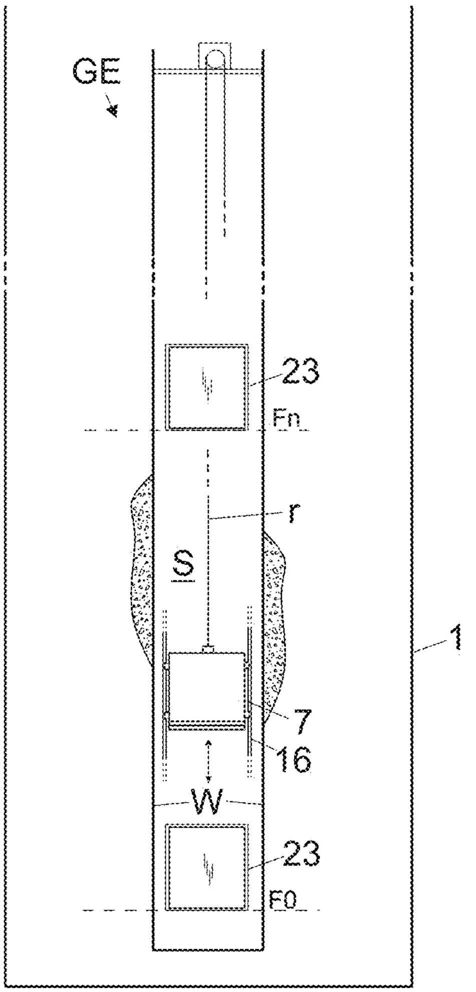
FIG. 10 illustrates partially the goods elevator from the side of the opening leading to the shaft in which the load receiving unit is movable.
Figure 11:
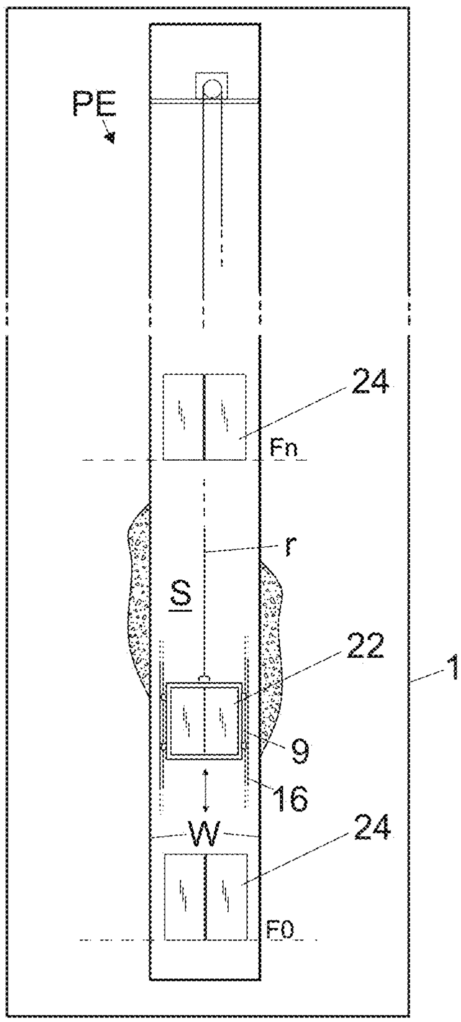
FIG. 11 illustrates partially a passenger elevator constructed in place of the goods elevator of FIG. 10.

FIGS. 10 and 11 together illustrate transition between construction time arrangement and the final arrangement in the building 1. FIG. 10 illustrates partially the goods elevator GE of FIG. 1 from the side of the opening leading to the shaft in which the load receiving unit is movable. The method for constructing a building according to the invention comprises constructing a passenger elevator PE in place of the aforementioned goods elevator GE. FIG. 11 illustrates partially a passenger elevator PE constructed in place of the goods elevator GE of FIG. 10.

Said constructing comprises a passenger elevator PE in place of the aforementioned goods elevator GE constructing a passenger elevator car for transporting people in place of the load receiving unit of the goods transport elevator, wherein the passenger elevator car 9 is made to comprise an interior delimited by floor, walls, ceiling and at least one automatic door 22. Presence of an automatic door (i.e. a door opening and closing movement which is motor driven under control of a control system) 22 is not necessary when transporting said containers 9 with the goods elevator GE. However, such a door 22 is a typical requirement for convenient and safe use for passengers. Preferably, opening and closing movement of said automatic door 22 is motor driven under control of a control system. This control system may be for instance a newly installed control system or the control system 11 used during the method for transporting construction material and/or construction equipment into and inside a building 1 under construction or a part thereof such as the aforementioned sub-system 30 as such or as modified, in particular to fit into passenger elevator use. After said constructing, the method comprises using the passenger elevator car 9 to transport passengers between floors of the building 1. Said using passenger elevator car comprises receiving call signals from user interfaces and moving the passenger elevator car 9 in response to said call signals.

Generally, it is preferable that the load receiving unit 7 of the elevator for transporting goods GE does not comprise an automatic door, possibly not a door at all, as it is the case in the illustrated examples.

The load receiving unit 7 of the goods elevator need not be provided with closed space, accordingly it is advantageous, although not necessary, that is does not comprise an interior delimited by floor, walls, ceiling and an automatic door.

In context of said transition between construction time arrangement and the final arrangement in the building 1, the covers 23 of the shaft opening, which covers may be manual or automatic doors 23 for instance, can also be replaced with automatic doors 24. It may not be necessary to use covers 23 for covering the shaft opening 21, for instance if passage to the shaft S is efficiently blocked by other means e.g. by fences.

Preferably, the load receiving unit of the elevator for transporting goods is vertically movable along one or more vertically oriented guide rail lines in an elevator shaft during said method for transporting construction material and/or construction equipment into and inside a building 1 under construction.

Preferably, in said constructing a passenger elevator car for transporting people in place of the load receiving unit of the goods transport elevator, the passenger elevator car 9 is arranged to be vertically movable along one or more of the vertically oriented guide rail lines of the load receiving unit 7 of the elevator for transporting goods GE. Thus, transformation of the goods elevator to form a passenger elevator in its place is performed utilizing components of the goods elevator, which facilitates swiftness and economy of the transformation. In a preferred embodiment, one or more components comprised in the goods elevator car, such as one or more of a car frame, guide members, such as roller guides or slide guides, a transport platform, are utilized in the constructing a passenger elevator car in place of the goods elevator car. In this case, preferably said constructing a second passenger elevator car in place of the goods elevator car is performed such that one or more of a car frame, guide members, such as roller guides or slide guides, a transport platform form corresponding part(s) of the passenger elevator car. Thus, transformation of the goods elevator to form a passenger elevator in its place is performed utilizing components of the goods elevator, which facilitates swiftness and economy of the transformation.

FIGS. 10 and 11 illustrate also parts of a hoisting function. The hoisting function can be implemented by many different ways, such as by any known means, for instance. In each of FIGS. 10 and 11, the elevator is a drive sheave elevator utilizing a suspension roping, the hoisting function being only partially illustrated in these Figures. The drive sheave elevator can be a counterweighed elevator or counterweightless, for instance. This is however not necessary since also other types of elevators are known. The hoisting function can also be different before and after the transition between construction time arrangement and the final arrangement.

In the preferred embodiment, the method further comprises determining storage position of the container 9 identified in the order, e.g. based on data stored in a database D. Such data can associate a storage position for each container 9 stored in the storage 8. The database D can be stored in the control system 11, such as a main control system 100 thereof or in a cloud 101, for instance.

Said retrieving the container 9 identified in the order from the storage 8 comprises automatically moving the aforementioned transporting device 2 to the proximity of the storage position determined and thereby to proximity of the container 9 identified in the order, and automatically picking up the container from said storage position with the transporting device (2), and automatically transporting the container (9) away from its storage position with the transporting device (2). Thereby automatic retrieving of the containers 9 is facilitated.

Preferably, said automatically transporting the container (9) away from its storage position with the transporting device (2) comprises automatically placing the container 9 to be carried by another transporting device, such as a transporting device 3 for moving the container at least horizontally to a container loading floor (F0) of the building (1) under construction. Thereby automatic passing of the container 9 further in the process is facilitated.

The step of automatically transporting the container (9) away from its storage position with the transporting device (2) can also comprise, e.g. prior said placing the container 9 to be carried by another transporting device, automatically carrying the container (9) away from the storage (8, whereby automatic transport of the container 9 out from storage is achieved.

FIG. 5 illustrates preferred details of the transporting device 2. In the preferred embodiment illustrated, the transporting device 2 is suitable for picking up the containers 9 and to move them horizontally and vertically. Thus, it is able to store them in a storage 8 comprising a shelf arrangement comprising one or more shelfs. As mentioned, in is preferable, the shelf arrangement comprises one or more shelfs comprising at least 2, preferably more, such as 3-10 storeys for storing containers 9. Preferably, each storey comprises plurality of adjacent storage positions each suitable for receiving a container 9.

In FIG. 5, the transporting device 2 comprises a horizontally movable body 2*a* and a picking up equipment 2*b* vertically movably mounted on the body 2*b*. The body 2*a* is movable back and forth in horizontal direction beside a shelf so as to position the picking up shelf 2*b* as seen in vertical direction beside the storage position storing the container 9 to be retrieved, the vertically movably mounted picking up equipment 2*b* is movable back and forth in vertical direction so as to position the picking up equipment 2*b* in vertical direction at the height of the storage position storing the container 9 to be retrieved. Thus, the container 9 can be moved to be carried by the picking up equipment 2*b*. The body 2*b* is preferably provided with a lifting device, such as a hydraulic lift for moving the picking up equipment 2*b* vertically.

Structurally the picking up equipment 2*b* can be designed in many alternative ways. It could for instance be a pair of forks, in which case the transporting device 2 can be for example an automatically operable forklift, which can push its forks below a container 9 and lift it up. In FIG. 5, the picking up equipment 2*b* is a turning table with motor driven rotatable rollers forming a conveying track on top of which the container 9 can be moved supported by the conveying track. Thus, the conveyor 9 can be rolled away from its storage position simply. The storage positions can each be provided with rollers as well carrying the containers 9 so as to ease up movement of the containers to be supported by the picking up equipment 2*b*. The picking up equipment 2*b* being a turning table is optional, but it facilitates that the container 9 can be simply placed to be carried by another transporting device, which is in Figure the transporting device 3 for moving the container at least horizontally to a container loading floor F0 of the building 1 under construction, and in particular a section 3*a* thereof having its transport direction parallel with the direction in which the storage positions are adjacent to each other.

Preferably, a detector 18*a* is mounted on the transporting device 2, which detector 18*a* is configured to detect identifications 10 of containers 9 and/or identifications 24 of storage positions when the transporting device 2 is retrieving a container 9 identified in the order from the storage 8.

In the preferred embodiment illustrated in FIG. 5, the control system 11 comprises a sub-control system 20 configured to control operation of the transporting device 2 for retrieving the container 9 identified in the order from the storage 8. The sub-control system 20 can in this case comprise, for instance, a control unit 20*a* mounted on said transporting device 2. The sub-control system 20 of control system 11, in particular the control unit 20*a* thereof, is configured to detect identifications 10 of containers 9 and/or identifications 24 of storage positions by aid of the detector 18*a*.

The arrangement of FIG. 1 is configured to implement the method as described in this application. Preferred details of the arrangement are described and disclosed in reference to FIGS. 1-11. The arrangement for transporting construction material and/or construction equipment into and inside a building under construction, which building under construction comprises plurality of vertically displaced floors, comprises one or more transporting devices 2-6, GE comprising an elevator GE for transporting goods in the building 1 under construction, the goods transport elevator GE comprising a load receiving unit 7 vertically movable, preferably along one or more guide rail lines 16 as illustrated in FIG. 10, in an elevator shaft S formed in the building 1 under construction; and a storage 8 at the construction site of the building 1 under construction storing plurality of transport containers 9, each containing construction material 9*d* and/or construction equipment 9*d*'; wherein each said transport container 9 comprises a container body 9*a* delimiting an interior 9*b* where the construction material 9*d* and/or construction equipment 9*d*' stored by the container 9 are positioned, and an identification 10 provided on the container body 9*a* for identifying the container 9 and possibly also its destination floor in the building 1. The identification 10 preferably is in the form of an identification equipment mounted on the container body 9*a* or markings printed on the container body 9*a* or on any element mounted thereon. The identification 10 is detectable, e.g. by a detector, such as an electronic detector or possibly by a person, from the outside of the container 9, in particular without entering or opening the container 9. Each said transport container 9, in particular the container body 9*a* thereof, preferably moreover comprises a door or an openable wall 9*c*, which may or may not be similar in shape and position in different containers 9.

The arrangement moreover comprises a control system 11 configured to obtain an order identifying a container 9 to be delivered, as well as to obtain a destination floor information (such as a floor code) indicating the destination floor of the container 9 identified in the order.

The control system 11 is configured to automatically operate one or more of said transporting devices 2-6, GE, preferably all of them, for automatically performing one or more, possibly all, parts, respectively, of the delivering of the container 9 identified in the order from the storage 8 to its destination floor.

In the arrangement presented in FIG. 1, said one or more transporting devices 2-6, GE comprise plurality of more transporting devices 2-6, GE, namely a transporting device 2 for retrieving the container 9 identified in the order from the storage 8; a transporting device 3 for moving the container identified in the order at least horizontally to a container loading floor F0 of the building 1 under construction; a loading device 4 for loading the container 9 identified in the order on the load receiving unit 7, said loading device 4 being mounted at the loading floor F0, preferably in front of an opening 21 leading to the shaft 6 in which the load receiving unit 7 is movable; an loading and unloading device 5 for loading the container 9 identified in the order to and unloading it from the load receiving unit 7, said loading and unloading device 5 being mounted on the load receiving unit 7, preferably on top of a transport platform 7*a* of the load receiving unit 7; an unloading device 6 for unloading the container 9 identified in the order from the load receiving unit 7, said unloading device 6 being mounted at the destination floor F1-Fn, preferably in front of an opening 21 leading to the shaft 6 in which the load receiving unit 7 is movable; and the aforementioned elevator GE for moving the container 9 identified in the order from the storage 8 on the load receiving unit 7 vertically in the elevator shaft S to the destination floor of the container 9.

The destination floor information (such as a floor code) indicating the destination floor of the container 9 identified in the order may or may not be included in the order, this being optional, since the destination floor information (such as a floor code) indicating the destination floor can be obtained also separately from said obtaining the order, e.g. when the container 9 identified in the order is at the loading floor F0 or at least partially on the load receiving unit 7.

The control system 11 comprises one or more detectors 18*a*,18*b*,18*c* for detecting the identifications 10 of the containers 9. Such detectors facilitate automatic operation of the transporting devices since in this way the control system 11 can monitor and control progress of delivery of the container 9 identified in the order. For this purpose, it is preferable that the one or more detectors 18*a*,18*b*,18*c* are automatically operated by the control system 11.

In FIG. 3, there is a detector 18*b*, 18*c* mounted in two alternative locations, namely at the loading floor F0 and on the load receiving unit 7. In the illustrated embodiment, the control system 11 is configured to detect the identification 10 of the aforementioned container 9 when it is at the loading floor F0 or at least partially on the load receiving unit 7, preferably by aid of a detector 18*b*, 18*c* mounted at the loading floor F0 or on the load receiving unit 7, respectively. The control system 11 is preferably moreover at this point configured to determine the destination floor of the container 9 using the data detected from the identification 10, e.g. said determining can comprise retrieving from a database D a destination floor code associated with the container 9, in particular with an identification code thereof, or detecting a destination floor code associated with the container 9 from the identification 10 itself. Hereby, the destination floor of the container entering the elevator can be determined for the purposes of the elevator.

Figure 7:
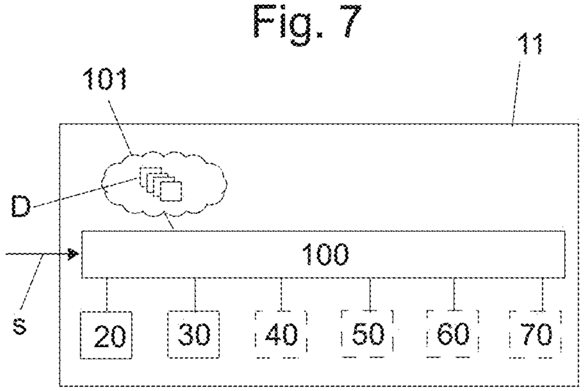
FIG. 7 illustrates preferred details of the control system.

In the preferred embodiment illustrated in FIG. 7, the control system 11 comprises a sub-control system 20 configured to automatically operate the transporting device 2 to retrieve the container 9 identified in the order from the storage 8. The sub-control system 20 can in this case comprise for instance a control unit mounted in the storage 8 and/or a control unit mounted on said transporting device 2.

In the preferred embodiment illustrated in FIG. 7, the control system 11 comprises a sub-control system 30 configured to automatically operate the goods elevator GE to move the load receiving unit 7 vertically in the elevator shaft S to the destination floor of the container 9. The sub-control system 30 can in this case comprise for instance an elevator control unit mounted inside, beside or above the shaft S. It is preferable that the sub-control system 30 is configured to obtain the destination floor information (such as a destination floor code) indicating the destination floor of the container 9 identified in the order when the container 9 identified in the order is at the loading floor F0 or at least partially on the load receiving unit 7. Thus, the sub-control system 30 responsible for elevator operations obtains this information in time so that it can carry out transporting the container 9 to a correct floor. The destination floor information (such as a destination floor code) indicating the destination floor to be obtained can be provided by the aforementioned determining the destination floor of the container 9 using the data detected from the identification 10.

In the preferred embodiment illustrated in FIG. 7, the control system 11 moreover comprises a sub-control system 40 configured to automatically operate the transporting device 3 for moving the container identified in the order at least horizontally to a container loading floor F0 of the building 1 under construction, and a sub-control system 50 configured to automatically operate the loading device 4 for loading the container 9 identified in the order on the load receiving unit 7, and a sub-control system 60 configured to automatically operate the loading and unloading device 5, and a sub-control system 70 configured to automatically operate the unloading device 6. One or more of the sub-control systems may not be necessary, whereby sub-control systems 40-70 have been drawn in broken line.

In the preferred embodiment illustrated in FIG. 7, the control system 11 comprises a main control system 100 to which the sub-control systems 20-70 are connected. The main control system 100 is preferably configured to at least monitor the operation of all the sub-control systems 20-70 thereof whereby they operate under supervision of the main control system 100. The main control system 100 can be configured to send signals to one or more of the sub-control systems 20-70 for controlling their operation and it can be configured to receive signals from the sub-control systems, whereby monitoring of their operation is facilitated. Some of the sub-control systems 20-70 can be configured to operate independently without interference or control by the control system 11. This facilitates making of some parts of the delivering more simple.

Generally, the obtaining an order identifying a container 9 to be delivered is performed by the control system 11. Preferably, said obtaining comprises receiving an order signal s from an equipment 21 communicating with the control system 11. This makes it possible that orders are sent to the control system 11. This facilitates that the order can come based on need or schedule that is not known by the control system 11. For example, a construction worker can order from the storage 8 at an optimal moment construction material and/or equipment that is needed at the constructions site. In the preferred embodiment illustrated in FIG. 7, the main control system 100 is configured to receive the order signal s.

Figure 8:
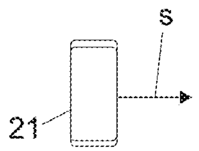
FIG. 8 illustrates preferred details of an arrangement for obtaining an order.

FIG. 8 illustrates an example of the aforementioned equipment 21 communicating with the control system 11. In this case, said equipment 21 comprises a communication device 21 with a user interface program running thereon, and operating which user interface a user can make an order. In the preferred example, the device 21 is a mobile communication device, such as mobile phone, a computer or a tablet.

Although preferable, it is not necessary that the control system 11 is configured to receive an order signal s from an external source since alternatively (or additionally) it can be configured to make orders itself, e.g. based on a schedule stored on the control system 11 itself.

Generally, the method and arrangement according to the invention are advantageous in context where the construction site is large and potentially high in traffic, such as when the building under construction is tall. The advantages are most considerable in this kind of context and scale. For this reason, preferably, said different destination floors F1-Fn include at least 5 different destination floors, preferably more, such as more than 10 different destination floors, possibly more than 20 different destination floors, possibly even more than 50 different destination floors. In the arrangement, an while performing the method, respectively, the building under construction can be, although this is not necessary, relatively high, such as more than 100 meters high, for example. The building 1 under construction can be a tower building which rises during the construction. The invention is, however, advantageous also in cases where the building under construction has already reached its final height. For the aforementioned same reason, it is also preferable that said storage 8 stores more than 20, preferably more than 50, more preferably more than 100, of said containers.

Generally, it is preferable that each said identification 10 of a container stores or presents in a detectable manner an identification code of the container in question and/or its destination floor code.

Generally, it is preferable that the storage 8 is located outside the building 1 under construction. The storage 8 is most preferably less than 1 kilometer the building 1 under construction.

As for the configuration of the storage, it is preferable that the storage 8 comprises a shelf arrangement comprising one or more shelfs. This type of storage is space efficient and well suitable for storing containers 9 as disclosed in this application. Preferably, the shelf arrangement comprises one or more shelfs comprising at least 2, preferably more, such as 3-10 storeys for storing containers 9. Preferably, each storey comprises plurality of adjacent storage positions each suitable for receiving a container 9. The storage preferably comprises an identification 24 per each storage position identifying the storage position in question.

Figure 6:
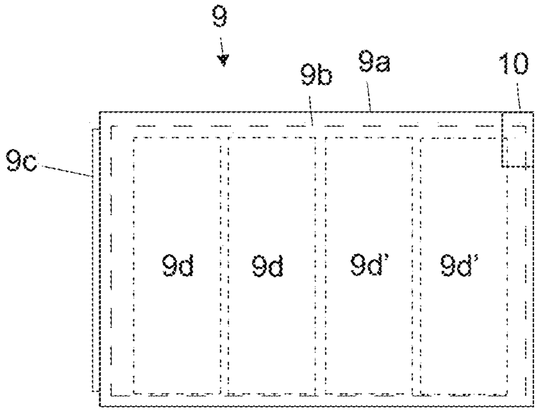
FIG. 6 illustrates preferred details of the container.

In FIG. 6, preferred structure and configuration of a container 9 is illustrated. The containers 9 are preferably of the same or at least substantially of the same size and shape. The containers have each four walls, a ceiling and a floor. One or more of the walls 9*c* of each container can be openable or comprise a door. It is preferable that the containers are rectangular cuboids.

Preferably, the containers 9 are such large that the interior of each container is at least 4 m3 in volume, preferable larger. Thus, they can all serve for transporting inside them various different large objects. The width height and length of each container are each at least 1 m, preferable larger.

Preferably, the body of the container comprises metal, preferably majority (i.e. more than half) of its weight is produced by metal material. This means that the containers 9 are metal containers and they are durable for use in many construction sites.

The bodies 9*a* of each of the containers 9 preferably delimits an interior where the construction material and/or equipment stored by the container 9 are positioned, and the interiors 9*b* of the containers 9 are preferably of same or at least substantially same size and shape.

Generally, it is preferable that the aforementioned elevator shaft S is a space inside the building. This is advantageous since in this way, the construction time vertical transport as described can simply be performed using a space which can safely and efficiently used also for passenger transport of the elevator of the final building. The elevator shaft S is preferably a space surrounded by walls W of the building, said walls preferably being concrete walls.

Generally, it is preferable that the identification codes of the containers 9 are different from each other.

Preferably, said one or more detectors comprise plurality of detectors within the building under construction at spaced apart locations, preferably including one or more of: a detector 18*a* in the storage, a detector 18*b* at the loading floor F0, a detector 18*c* on the load receiving unit, a detector 18*d* at one or more destination floors F1-Fn. This facilitates tracing of the container 9 during its transportation.

The detectors 18*a*-18*d* are preferably more specifically such that each said detector 18*a*-18*d* has a detection range, whereby detection of an identification 10 of a container 9 within the detection range indicates that the container 9 is within the detection range and thereby the location of the container 9. The detector is preferably an RFID-detector in which case the identification equipment 10 preferably comprises an RFID-device such as an RFID-tag. The detector can alternatively be for instance a so called Bluetooth device.

The database D preferably stores a location code associated with the identification code of each container, the location code preferably indicating location of the container 9 in question. This facilitates monitoring of the location of the container 9 during its transportation.

The database D can be stored physically anywhere as long as it is accessible sufficiently reliably. Preferably, it is stored in a cloud 101 comprised in the control system 11.

The database D is preferably readable by a user interface program installed on a mobile communication device 21, such as a phone or a tablet.

The database is preferably modifiable by a user interface program installed on the mobile communication device 21, such as a phone or a tablet.

The control system 11 is preferably configured to automatically update in the database D the location code of a container 9 in response to detection of the identification 10 of the container 9 by a detector 18*a*-18*d*.

A program installed on a mobile communication device 22, such as a phone or a tablet is preferably configured to detect a change in location code of a container 9. The program can preferably further be configured to indicate, e.g. on a display thereof, to the user of the mobile communication device 22 an alarm or the updated location of the container 9.

As mentioned, the conveying track T preferably comprises one or more rotatable elements 23 which can be rotatable rollers, for instance. In this case, the rollers preferably comprise a line of rollers with parallel rotational axes so that a container 9 can be moved supported by the conveying track linearly. A more sophisticated implementation of a conveying track can be used, where omnidirectional movement on the conveying track can be achieved, for example using a conveying track comprising so called omni-directional movement modules such as known from a commercially available Omnidirectional Cellular Conveyor, for example.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for transporting construction material or equipment into and within a building under construction, the building under construction including a plurality of vertically displaced floors, and the method comprising:

providing one or more transporting devices for transporting transport containers, said one or more transporting devices including at least an elevator, the elevator including at least a load receiving unit vertically movable in an elevator shaft formed inside the building under construction;

providing a control system configured to automatically operate said one or more transporting devices;

providing a storage at a construction site of the building under construction; and transporting into the storage a plurality of transport containers, each of the plurality of transport containers containing the construction material or equipment, each of the plurality of transport containers including a container body, and the container body of each respective transport container among the plurality of transport containers including an identification for identifying the respective transport container;

storing said plurality of transport containers in the storage; and delivering multiple transport containers among said plurality of transport containers from said storage to different destination floors among the plurality of vertically displaced floors, the delivering including, obtaining an order to deliver a first transport container among the multiple transport containers, the order identifying the first transport container to be delivered, retrieving the first transport container identified in the order from the storage, moving said first transport container at least horizontally to a container loading floor of the building under construction, the container loading floor being among the plurality of vertically displaced floors, loading said first transport container on the load receiving unit for being moved to a first destination floor among the different destination floors, obtaining destination floor information indicating the first destination floor corresponding to the first transport container;

moving the load receiving unit vertically in the elevator shaft to the first destination floor, and unloading said first transport container from the load receiving unit to the first destination floor.

2. The method according to claim 1, wherein one or more of the retrieving the first transport container, the moving the first transport container at least horizontally, the loading the first transport container on the load receiving unit, the moving the load receiving unit vertically, or unloading the first transport container from the load receiving unit, is performed by the one or more transporting devices.

3. The method according to claim 1, wherein said one or more transporting devices comprise one or more of:

a transporting device for retrieving the transport containers from the storage;

a transporting device for moving the transport containers at least horizontally to the container loading floor;

a loading device for loading the transport containers on the load receiving unit, said loading device being mounted at the container loading floor;

a loading and unloading device for loading the transport containers to and for unloading the transport containers from the load receiving unit, said loading and unloading device being mounted on the load receiving unit;

unloading devices for unloading the transport containers from the load receiving unit, said unloading devices being mounted at the different destination floors; and the elevator for moving the transport containers on the load receiving unit vertically in the elevator shaft to the different destination floors of the transport containers.

4. The method according to claim 1, wherein the obtaining the order is performed by the control system.

5. The method according to claim 1, wherein the obtaining the destination floor information is performed by the control system.

6. The method according to claim 1, wherein the obtaining the destination floor information is performed based on the first transport container being at the container loading floor or at least partially on the load receiving unit.

7. The method according to claim 1, further comprising:

detecting the identification of the first transport container based on the first transport container being at the container loading floor or at least partially on the load receiving unit.

8. The method according to claim 1, wherein said moving the load receiving unit vertically in the elevator shaft is performed by the elevator automatically operated by the control system.

9. The method according to claim 1, wherein said retrieving the first transport container identified in the order from the storage is performed by a transporting device automatically operated by the control system.

10. A method for constructing a building, the method comprising:

transporting construction material or equipment into and within a building under construction according to the method of claim 1; and constructing structures of the building under construction using the construction material or equipment transported in the plurality of vertically displaced floors of the building under construction.

11. The method according to claim 1, further comprising:

constructing a passenger elevator in place of the elevator, said constructing including, constructing a passenger elevator car for transporting people in place of the load receiving unit, the passenger elevator car being constructed to have an interior delimited by floor, walls, ceiling and at least one automatic door; and using the passenger elevator car to transport the people between the vertically displaced floors of the building.

12. An arrangement for transporting construction material or equipment into and within a building under construction, the building under construction including a plurality of vertically displaced floors, and the arrangement comprising:

one or more transporting devices including at least an elevator, the elevator including at least a load receiving unit vertically movable in an elevator shaft formed inside the building under construction;

a storage at a construction site of the building under construction storing a plurality of transport containers, each of the plurality of transport containers containing construction material or equipment, each of the plurality of transport containers including a container body, and the container body of each respective transport container among the plurality of transport containers including an identification for identifying the respective transport container; and a control system configured to, obtain an order identifying a first transport container to be delivered, the first transport container being among the plurality of transport containers, obtain destination floor information indicating a destination floor of the first transport container, the destination floor being among the plurality of vertically displaced floors, and automatically operate the one or more transporting devices to deliver the first transport container to the destination floor.

13. The arrangement according to claim 12, wherein said one or more transporting devices comprise one or more of:

a transporting device for retrieving the plurality of transport containers from the storage;

a transporting device for moving the plurality of transport containers at least horizontally to a container loading floor of the building under construction, the container loading floor being among the plurality of vertically displaced floors;

a loading device for loading the plurality of transport containers on the load receiving unit, said loading device being mounted at the container loading floor;

a loading and unloading device for loading the plurality of transport containers to and unloading the plurality of transport containers from the load receiving unit, said loading and unloading device being mounted on the load receiving unit; and unloading devices for unloading the plurality of transport containers from the load receiving unit, said unloading devices being mounted at different destination floors among the plurality of vertically displaced floors.

14. The arrangement according to claim 12, wherein the control system comprises one or more detectors for detecting the identifications of each respective transport container among the plurality of transport containers.

15. The arrangement according to claim 12, wherein the control system is configured to obtain the destination floor information based on the first transport container being at a container loading floor of the building under construction or at least partially on the load receiving unit.

16. The arrangement according to claim 12, wherein the control system is configured to detect the identification of the first transport container based on the first transport container being at a container loading floor of the building under construction or at least partially on the load receiving unit.

17. The arrangement according to claim 12, wherein the plurality of transport containers are of a common size and a common shape.

18. The arrangement according to claim 12, wherein the control system is configured to automatically operate a transporting device to retrieve the first transport container from the storage.

19. The arrangement according to claim 12, wherein the control system is configured to automatically operate the elevator to move the load receiving unit vertically in the elevator shaft to the destination floor of the first transport container.

20. The method according to claim 1, wherein the storage is outside of the building under construction;

the one or more transporting devices includes a plurality of transporting devices; and at least one among the retrieving the first transport container or the moving the first transport container at least horizontally is automatically performed by the plurality of transporting devices.

* * * * *